United States Patent
Frank

(10) Patent No.: US 7,822,287 B2
(45) Date of Patent: Oct. 26, 2010

(54) REMOVAL OF STATIONARY NOISE PATTERN FROM DIGITAL IMAGES

(75) Inventor: Michael Frank, Sunnyvale, CA (US)

(73) Assignee: PIXIM, Inc., Mountain View, CA (US)

( * ) Notice: Subject to any disclaimer, the term of this patent is extended or adjusted under 35 U.S.C. 154(b) by 415 days.

(21) Appl. No.: 12/043,877

(22) Filed: Mar. 6, 2008

(65) Prior Publication Data

US 2008/0151081 A1    Jun. 26, 2008

Related U.S. Application Data

(62) Division of application No. 10/713,498, filed on Nov. 13, 2003, now Pat. No. 7,362,911.

(51) Int. Cl.
*G06K 9/40* (2006.01)

(52) U.S. Cl. ...................... 382/260; 382/205

(58) Field of Classification Search .............. 348/415.1; 382/205, 209, 260; 455/63.1, 67.13, 114.2, 455/278.1, 283, 296, 501, 570; 700/52, 291; 702/117, 191, 195; 703/22; 704/219, 262; 706/21; 708/553; 712/E9.051, E9.052; 725/124, 725/125

See application file for complete search history.

(56) References Cited

U.S. PATENT DOCUMENTS 5,170,440 A * 12/1992 Cox ........................... 382/199
2003/0179944 A1* 9/2003 Gindele et al. .............. 382/260

* cited by examiner

*Primary Examiner*—Matthew C Bella
*Assistant Examiner*—Gregory F Cunningham
(74) *Attorney, Agent, or Firm*—Patent Law Group LLP; Carmen C. Cook

(57) ABSTRACT

A method for removing a stationary noise pattern from digital images uses an adaptive noise estimation algorithm to calculate a prediction of the fixed pattern noise and a confidence estimate for the prediction. In one embodiment, a predicted noise value is obtained from the captured image and a predicted image derived from spatial and temporal pixel value prediction techniques. The predicted noise value is used to update a fixed pattern noise estimate only when the confidence estimate for the predicted image is high. In another embodiment, the confidence estimate is used as a weight factor for blending the noise prediction into the noise estimate. In yet another embodiment, the adaptive noise estimation algorithm is applied to a prediction area in the image for calculating scaling parameters which scaling parameters are used to calculate a noise estimate for the entire image based on a reference noise image.

9 Claims, 7 Drawing Sheets d= distance

REMOVAL OF STATIONARY NOISE PATTERN FROM DIGITAL IMAGES

CROSS REFERENCE TO RELATED APPLICATION

This application is a divisional of application Ser. No. 10/713,498, filed Nov. 13, 2003, entitled "Removal of Stationary Noise Pattern From Digital Images" of the same inventor hereof, now U.S. Pat. No. 7,362,911, issued Aug. 22, 2008, which application is incorporated herein by reference in its entirety.

FIELD OF THE INVENTION

The invention relates to digital imaging and, in particular, to a method for subtracting stationary noise pattern noise in a digital image.

DESCRIPTION OF THE RELATED ART

A digital imaging system for still or motion images uses an image sensor or a photosensitive device that is sensitive to a broad spectrum of light to capture an image of a scene. The photosensitive device reacts to light reflected from the scene and can translate the strength of that light into electronic signals that are digitized. Generally, an image sensor includes a two-dimensional array of light detecting elements, also called pixels, and generates electronic signals, also called pixel data, at each light detecting element that are indicative of the intensity of the light impinging upon each light detecting element. Thus, the sensor data generated by an image sensor is often represented as a two-dimensional array of pixel data.

A CMOS image sensor with pixel level analog-to-digital conversion is described in U.S. Pat. No. 5,461,425 of B. Fowler et al. (the '425 patent). Such an image sensor, referred to as a digital pixel sensor (DPS), provides a digital output signal at each pixel element representing the light intensity detected by that pixel element. The combination of a photo-detector and an analog-to-digital (A/D) converter in an area image sensor helps enhance detection accuracy, reduce power consumption, and improves overall system performance.

CMOS image sensors generally exhibit fixed pattern noise that is visible as a stationary image pattern superimposed on captured images. Fixed pattern noise is considered one of the major weaknesses and deficiencies of CMOS digital image sensors. Fixed pattern noise is the result of multiple effects that yield variations and nonuniformity in individual pixel performance and response to light.

First, CMOS image sensors typically suffer from temperature dependent dark current that reduces the signal to noise ratio of the image sensor and limits the sensitivity of the image sensor. Dark current generally relates to the leakage current from the photodiodes or photo-transistors that are used as the light detecting elements in the image sensor. To make matters worse, the dark current is not spatially uniform but rather is randomly distributed and varies as a function of pixel location on the image sensor. As a result, when a CMOS image sensor is used to capture an image, the dark current associated with each pixel becomes a fixed pattern noise image superimposed on the desired image. The fixed pattern noise image is particularly visible in dark scenes and results in reduced sensitivity of the image sensor.

Other factors contributing to fixed pattern noise in a CMOS image sensor include spatially non-uniform capture of light, spatial variation in analog-to-digital conversion, and spatial parametric variation in the pixel circuitry in the image sensor. These factors can be a result of spatial variations in the optical filter structure on top of the sensor, spatial variation in the micro lenses on top of the sensor, spatial variation in the conversion efficiency of the photodiodes, voltage drop across the pixel array, and spatial variation in the transistor threshold voltage, transistor gain and geometries.

Fixed pattern noise in a CMOS image sensor is a unique image for each image sensor and the fixed pattern noise may vary as a function of image brightness, temperature, operating voltage, and other operating parameters. To increase the sensitivity of the image sensor and to improve the quality of the captured images, it is desirable to remove the fixed pattern noise from the captured images to increase the sensitivity of the image sensor and the quality of the captured images. In general, fixed pattern noise is time invariant and can be removed from a captured image if the pattern is known. However, because the fixed pattern noise can vary with various operating conditions, the fixed pattern noise image will vary accordingly making elimination of the image difficult.

Conventional methods for fixed pattern noise subtraction are unsatisfactory. U.S. Pat. No. 6,061,092 discloses a method for eliminating fixed pattern noise by storing a large number of fixed pattern noise images, also called dark images, in a host computer and then retrieving the dark images from the host computer based on different operation parameters of the camera. Such method requires large amount of memory and requires the image sensor to be tethered to a host computer which is not practical for portable applications. U.S. Pat. No. 6,535,617 discloses a method for removal of fixed pattern noise by estimating the fixed noise pattern from a composite image which composite image is derived by summing multiple image frames captured at a uniform illumination. Then, for each frame of image, the fixed pattern noise is estimated as a dot product of the image frame and the normalized filtered composite image. This method is not satisfactory because it does not take into consideration changes in the fixed pattern noise due to operating parameters of the image sensor. For example, fixed pattern noise usually varies with temperature. As temperature changes, the fixed pattern noise either becomes more pronounced or fades away. A fixed pattern noise removal method that does not take into consideration the temperature variation of the fixed pattern noise is ineffective in removing the noise component in a captured image.

Therefore, an improved method for accurately determining fixed pattern noise and subtracting the fixed pattern noise from images captured by a digital image sensor is desired.

SUMMARY OF THE INVENTION

According to one embodiment of the present invention, a method for subtracting fixed pattern noise in a digital imaging system incorporating a digital image sensor includes: acquiring a frame of pixel data; for each pixel in the frame, calculating a predicted pixel value based on the pixel data of a neighborhood of pixels surrounding the pixel and using one or more pixel value prediction algorithms; for each pixel in the frame, calculating a predicted noise value using the predicted pixel value and the pixel data for the pixel; calculating a confidence estimate for each predicted pixel value; calculating a fixed pattern noise estimate for each pixel using the predicted noise value and the confidence estimate where the confidence estimate determines the amount of predicted noise value to be incorporated into the fixed pattern noise estimate for the pixel; temporally filtering the fixed pattern noise estimate; and subtracting the fixed pattern noise estimate for each pixel from the frame of pixel data to generate a final image.

In another embodiment, the adaptive fixed pattern noise estimation algorithm of the present invention is applied to a prediction area within the frame of pixel data. A reference noise image of a homogeneous, smooth surface is acquired. The fixed pattern noise estimate obtained for the prediction area is used to compute scaling parameters for scaling the reference noise image to provide a fixed pattern noise estimate for the entire image.

The present invention is better understood upon consideration of the detailed description below and the accompanying drawings.

DETAILED DESCRIPTION OF THE PREFERRED EMBODIMENTS

Figure 1:
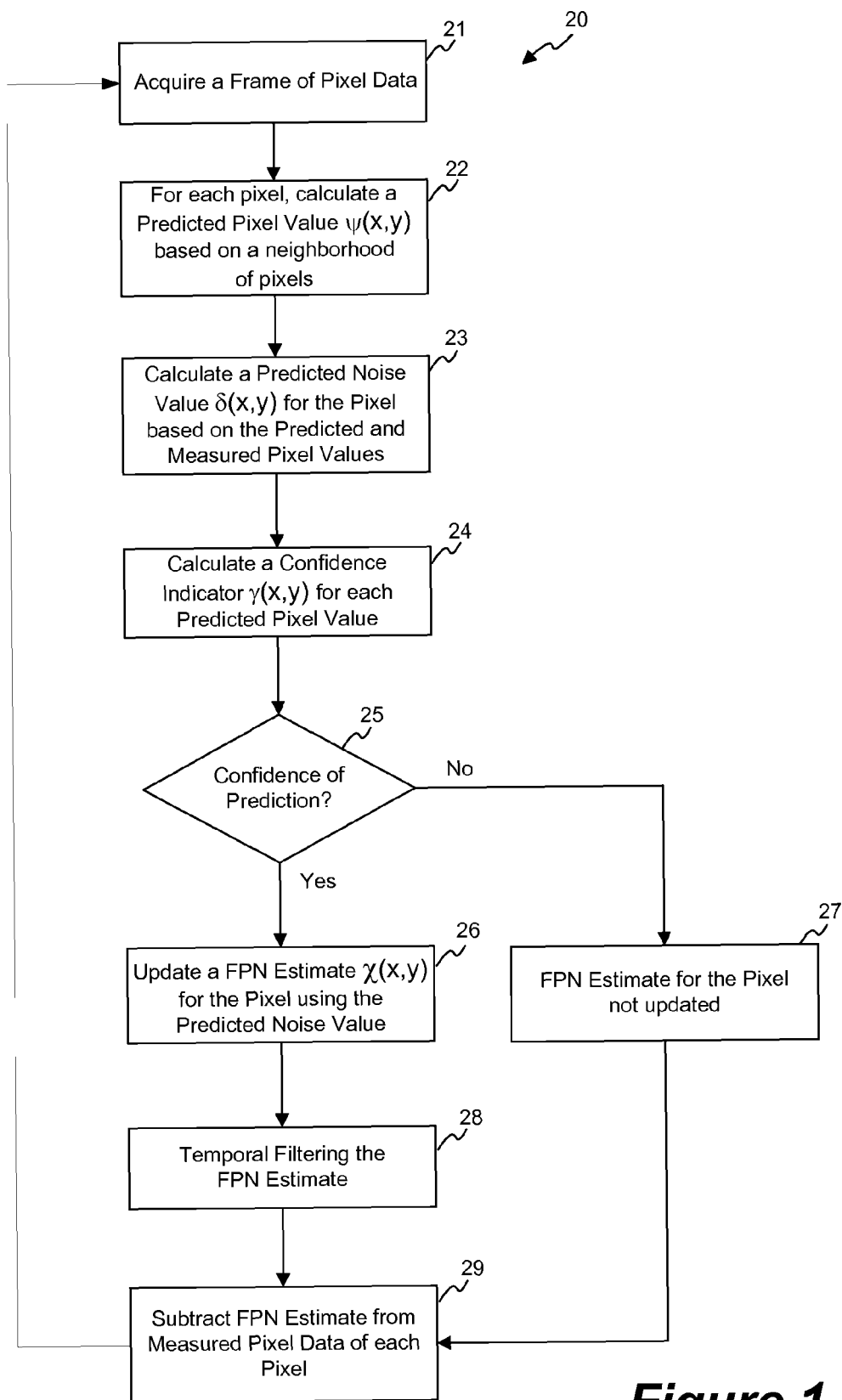
FIG. 1 is a flow chart illustrating the stationary noise pattern removal method according to one embodiment of the present invention.

In accordance with the principles of the present invention, a method in a digital imaging system for removing a stationary noise pattern from digital images uses an adaptive noise estimation algorithm to calculate a prediction of the fixed pattern noise and a confidence estimate for the prediction. Depending on the value of the confidence estimate, the noise prediction is selectively incorporated into a fixed pattern noise estimate. The fixed pattern noise estimate is applied to the captured images to remove the fixed pattern noise. Specifically, a noise prediction for each pixel is estimated based on the captured image and a decoded or "predicted" image derived using spatial and temporal prediction techniques. In one embodiment, the noise prediction is used to update the noise estimate only when the confidence estimate is greater than a threshold value. In another embodiment, the confidence estimate is used as a weight factor for blending the noise prediction into the noise estimate.

In another embodiment, the noise prediction algorithm is applied to a prediction area within the frame of pixel data. The noise estimate, together with a reference noise image, is used to calculate scaling parameters which scaling parameters are used to calculate a noise estimate for the entire image based on the reference noise image. The stationary noise pattern removal method of the present invention can be applied to effectively remove a fixed noise pattern in a digital imaging system despite changing operating conditions.

The stationary noise pattern removal method of the present invention can be implemented without any calibration or with just a single, non-critical calibration. Thus, there is no requirement for the digital imaging system to maintain a large amount of reference data for the image sensor as is usually required in conventional fixed pattern noise removal techniques. Furthermore, the stationary noise pattern removal method of the present invention can be implemented completely in hardware or in software with hardware support.

The stationary noise pattern removal method of the present invention exploits several known characteristics of digital image processing. First, it is known that in real images, there is a high correlation of pixel values between one pixel and its neighbors. Second, methods to determine the correlation between two patterns are known. Lastly, algorithms used to restore images by recreating missing, defective, or contaminated pixel values from their neighborhood are known. These algorithms, including interpolation and median filtering, calculate missing pixel values by assuming a certain statistical behavior of the ensemble of pixels in an image. In accordance with the present invention, the stationary noise pattern removal method incorporates pixel value interpolation or prediction algorithms commonly used to calculate missing pixel values to generate a decoded or "predicted" image. The predicted image and the actual image can then be used to estimate the noise pattern that is corrupting the captured image.

FIG. 1 is a flow chart illustrating the stationary noise pattern removal method according to one embodiment of the present invention. Stationary noise pattern removal method 20 can be implemented in any digital imaging systems incorporating a digital image sensor and is particularly useful when implemented in imaging systems using CMOS image sensors for eliminating fixed pattern noise. Stationary noise pattern removal method 20 (or method 20) is a close loop algorithm where a fixed pattern noise (FPN) estimate is calculated and continually updated as images are captured so that a highly accurate noise estimate is attained over time. In the following description, it is assumed that the temperature and operating voltage of the digital image sensor in the digital imaging system are constant over time. However, variations of the noise values based on temperature and operating voltage will be compensated by the adaptive nature of the noise removal method of the present invention.

Referring to FIG. 1, method 20 starts by acquiring a frame of pixel data (step 21). In the method of FIG. 1, no calibration of the digital imaging system is required. Rather, the captured image itself is used to estimate the stationary noise values. Then, for each pixel in the captured image, a predicted pixel value for a pixel is calculated based on a neighborhood of pixels (step 22). Specifically, the predicted pixel value for each pixel is calculated based on the pixel values of the neighborhood of pixels surrounding the pixel as the center pixel. In one embodiment, a 5×5 neighborhood of pixels is used and a predicted pixel value is calculated for the center pixel of each 5×5 neighborhood of pixels.

In the stationary noise removal method of the present invention, any pixel value prediction algorithms, currently known or to be developed, can be used to calculate the predicted pixel values. Furthermore, method 20 can be implemented using one or more of the pixel value prediction algorithms for calculating the predicted pixel values. The noise prediction can be more reliable when more prediction algorithms are applied. In the present embodiment, two or more of prediction algorithms are applied in method 20. When two or more prediction algorithms are applied, each prediction algorithm computes a predictor value for the center pixel. The final predicted pixel value can be computed using an average of the predictor values. Alternately, a majority vote can be taken. That is, the predicted pixel value for the center pixel can be calculated by averaging the predictor values that are within $0.5\sigma$ (sigma) of the distribution of all predictor values.

Prediction Algorithms

The following description details several pixel value prediction algorithms that can be applied in the stationary noise pattern removal method of the present invention. However, the list of prediction algorithms below is illustrative only and other prediction algorithms known in the art or to be developed can also be applied.

Figure 2A:
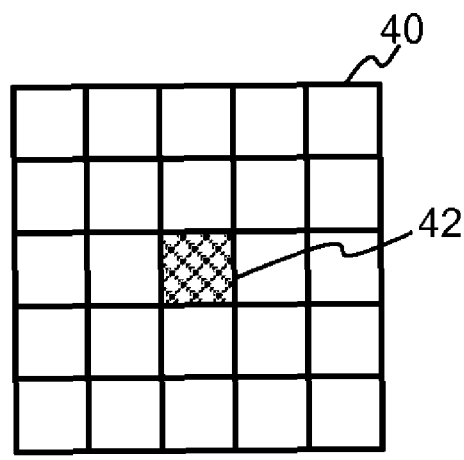
FIG. 2A illustrates a 5×5 neighborhood of pixels used to calculate a predicted pixel value for the center pixel.
Figure 2B:
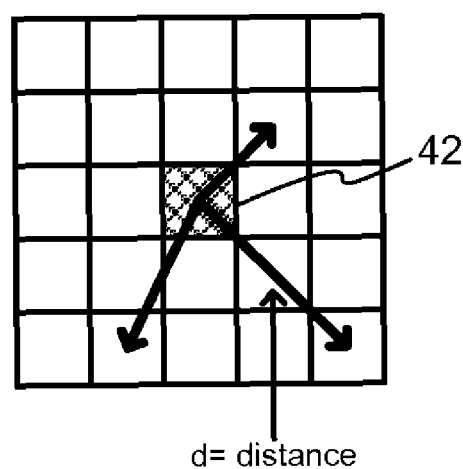
FIG. 2B illustrates a 5×5 neighborhood of pixels used to calculate a predicted pixel value for the center pixel using a weighted average.

FIG. 2A illustrates a 5×5 neighborhood of pixels used to calculate a predicted pixel value for the center pixel 42. In one embodiment, the prediction algorithm uses the average of the 5×5 neighborhood 40 of pixels with each pixel value in neighborhood is given equal weight. FIG. 2B illustrates a 5×5 neighborhood of pixels used to calculate a predicted pixel value for the center pixel using a weighted average. In FIG. 2B, a weighted average based on the inverse of the distance (1/d) between the center pixel to each neighboring pixel is used. In another embodiment, the weight factor can be derived from the median of each 3×3 sub-neighborhood of pixels.

In other embodiments, a contrast estimator determining the minimal and maximal pixel values (the pixel value range) within the area of the neighborhood can be used.

Alternately, a high frequency texture detector based on a two dimensional image transform (or a discrete transform), for example a DCT or FFT (Discrete Cosine Transform/Fast Fourier Transform), can be used to calculate the predicted pixel values. The detector will determine if there is a regular pattern (indicated by a small number of larger coefficients). Using the inverse transform would allow the removal of that particular spatial frequency (or frequencies) from the block before using the data in the spatial interpolators (a, b, c, d). For instance, the DCT transforms the image content for a pixel block (for example 8×8 pixels in JPEG) from the spatial to the frequency domain with the same number of coefficients. Coefficient $c[0,0]$ is considered the DC component and is equivalent to the "background" color of the pixel block. The higher frequency components within the block are then represented by coefficient with increasing indices—for example the highest frequency coefficient in x would be $c[7,0]$. Multiplying the 8×8 coefficients by a 2-D weighting matrix is equivalent to applying a 2-D filter in spatial space. Assuming that fine-grain texture is represented by the plurality of high frequency coefficients, applying a 2-D low-pass filter with a "cut-off" frequency close to the upper coefficients, such as the upper two coefficients, would leave the texture of the pixel block pretty much intact but filter out the noise components which fluctuate from pixel to pixel. As a result, the noise components of the pixel block that made up of the "high frequency" content can be calculated and removed from measured pixel values to derive the predicted pixel values.

Using one or more of the prediction algorithms described above or other algorithms, a predicted pixel value, denoted $\psi(x,y)$, is calculated for each pixel in the image (step 22). The predicted pixel value, $\psi(x,y)$, is subtracted from the measured pixel value, denoted $p(x,y)$, leaving as a residual, denoted $\delta(x,y)$, which is indicative of a predicted noise value for the pixel (step 23). Specifically, the predicted noise value $\delta(x,y)$ is give as:

$$\delta(x,y)=p(x,y)-\psi(x,y). \quad [\text{Eq. 1}]$$

Having calculated the predicted pixel value and the predicted noise value for each pixel, method 20 proceeds to estimate the reliability or the confidence of the prediction calculated. At step 24, a confidence indicator, denoted $\gamma(x,y)$, is calculated for each predicted pixel value.

When a predicted pixel value for a pixel is calculated using interpolation algorithms, the difference between captured pixel value and the predicted pixel value can be indicative of the noise component of the pixel. However, the difference can also be indicative of an error in the prediction and the captured pixel value actually does represent real image data. Prediction errors most often occur in images or image areas of high contrast or high texture. In such image areas, fast changing pixel values renders it difficult to predict a pixel value based on the neighborhood of pixel values. Thus, in accordance with the method of the present invention, a confidence indicator is computed to determine whether the predicted pixel value is reliable or not. The confidence indicator is a measure of the likelihood that the difference between the predicated pixel value and the captured pixel value is noise.

In the present embodiment, the confidence indicator $\gamma(x,y)$ for each pixel is determined based on the nature of the neighborhood of pixels, that is, what the neighborhood of pixels really looks like. First, the contrast of the area is considered. If an area defined by the neighborhood of pixels is a high contrast area characterized by lots of bright lines and fine details, then it is unlikely that the predicted pixel value correctly represents the real pixel value.

Second, the high frequency content of the pixel area can be considered. In one embodiment, a Fast Fourier Transform or DCT (discrete cosine transform) can be performed on a block of pixels surrounding the center pixel to determine whether the center pixel is part of a fixed frequency content pattern. If the pixel area is textured area with high frequency content, then it is also unlikely that the predicated pixel value correctly represents the real pixel value.

Furthermore, the smoothness of the pixel area can be considered. In a given pixel area, the amount of pixel values that deviates from a median value can be used to determine the smoothness of the area. If the area is smooth, the pixel values will not deviate significantly from the median value. If the pixel area is not smooth, in other words, if the pixel area is rough, then it is unlikely that the predicted pixel value correctly represents the real pixel value.

Some or all of the above considerations can contribute to the reliability or confidence of the predicted pixel value. Accordingly, a confidence indicator is derived to indicate whether the predicted pixel value should be trusted.

In one embodiment, a confidence indicator is calculated based on the contrast within a 5×5 neighborhood of pixels as follows. First, the average or the median pixel values of the 5×5 region is calculated. Then, the pixel with the largest difference from the average or the median) is determined. Then, the quotient of the difference divided by the average is computed. If the quotient exceeds a certain threshold, a "zero" value is assigned to the confidence indicator. If the quotient is less than or equal to the threshold, a "one" value is assigned to the confidence indicator. In other embodiments, the confidence indicator can be a continuous analog value proportional to the quotient.

In method 20, the confidence indicator is compared with a threshold (step 25). The threshold represents a confidence level of the prediction. If the confidence indicator is greater than the threshold, indicating that the predicted noise value is at least somewhat reliable, method 20 proceeds to compute a fixed pattern noise (FPN) estimate for the pixel based on the predicted noise value (step 26). Then, the FPN estimate is temporally filtered to remove random noise contributions from the sampling and quantization process and to create the FPN estimate denoted as $\chi(x,y)$ (step 28). The FPN estimate represents the noise component of the captured pixel value and is to be subtracted from the captured pixel value for removing the noise component.

On the other hand, if the confidence indicator is less than the threshold, then the predicted pixel value or the predicted noise value is not reliable and the noise value is not used to update the FPN estimate for the pixel (step 27). In this manner, unreliable predicted pixel values will not contaminate the FPN estimate for the pixels.

Finally, the FPN estimate $\chi(x,y)$ is used to remove the fixed pattern noise contribution from the captured image. Specifically, the FPN estimate $\chi(x,y)$ is subtracted from the captured pixel values to derive "clean" or noise-free pixel values for the captured frame of pixel data (step 29). The clean pixel value $P_{clean}(x,y)$ for a pixel is given as:

$$P_{clean}(x,y)=p(x,y)-\chi(x,y). \quad [\text{Eq. 2}]$$

After computation of the predicted pixel values and the FPN estimate for one frame of pixel data, method 20 returns to the start of the process where the next frame of pixel data is acquired. The stationary noise pattern removal method is thus an on-going operation where predictions for the pixel values are continually calculated and the estimates for the fixed pattern noise are continually updated, thereby forming a close loop algorithm. Over time, the fixed pattern noise estimate $\chi_n(x,y)$ will converge towards an almost constant value $\chi_\infty(x,y)$ if a large number of reliable predictions have been integrated. As a result, a fixed pattern noise estimate $\chi_\infty(x,y)$ for the digital imaging system that accurately represents the fixed pattern noise of the image sensor is attained.

Stationary noise pattern removal method 20 is completely adaptive and does not require any calibration of the image sensor at manufacturing time nor a model for the FPN to be provided. The method automatically adapts to changing light conditions, changing sensor temperature and different capture modes by constantly integrating reliable predicted noise values and learning the fixed pattern noise. In operation, the FPN estimate $\chi_n(x,y)$ value needs to be maintained and updated during the operation of the digital imaging system. In one embodiment, an additional storage of 6-8 bits per pixel is required.

In stationary noise pattern removal method 20, the fixed pattern noise estimate for each pixel is updated with the predicted noise value only when the confidence indicator exceeds a predetermined threshold. According to another embodiment of the present invention, the predicted noise value is blended into the fixed pattern noise estimate using a weight factor "α" where α is a function of the confidence of the prediction. Thus, if the confidence of the predicted noise value is high, the noise value is considered accurate and more of the newly calculated noise value is blended into the FPN estimate. If the confidence of the predicted noise value is low, then the noise value is considered not reliable and less of the newly calculated noise value is blended into the FPN estimate. In some cases, the confidence can be so low that the weight factor α is zero such that no noise value is blended into the FPN estimate.

Figure 3:
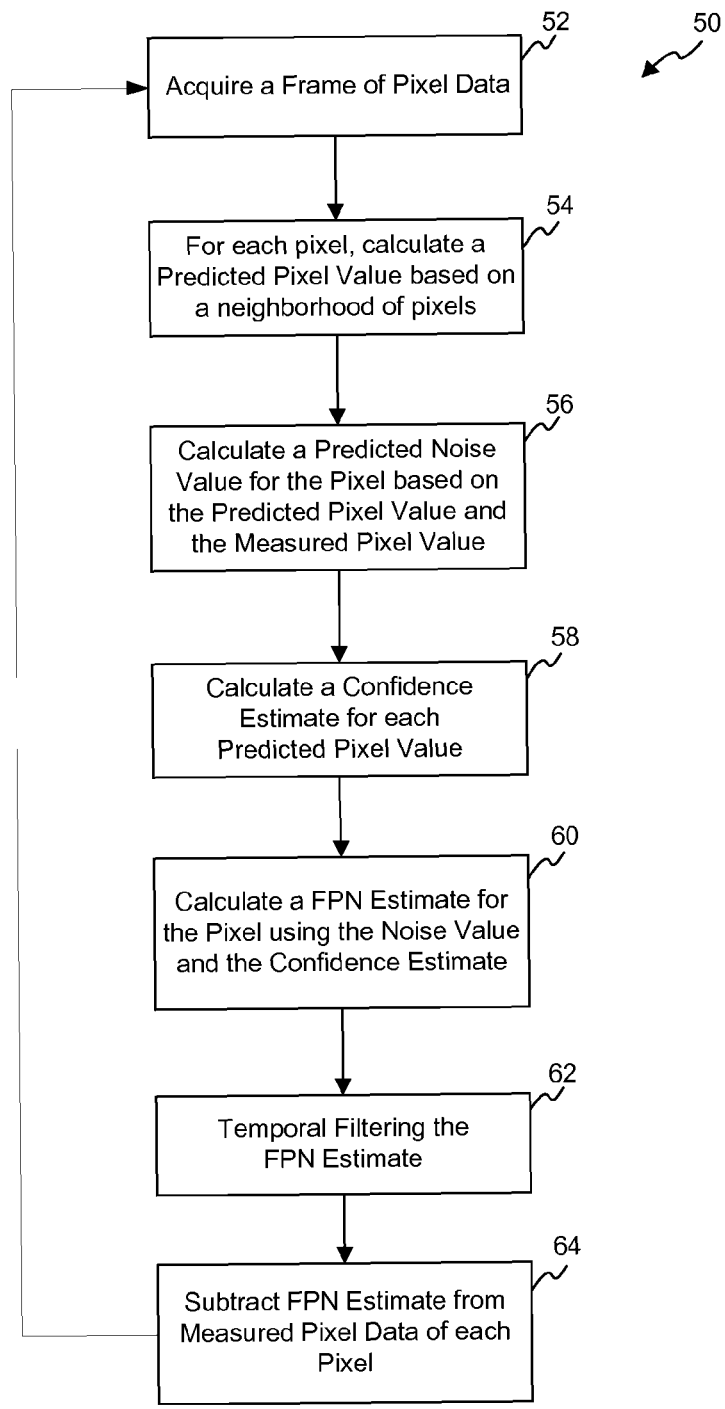
FIG. 3 is a flow chart illustrating the stationary noise pattern removal method according to another embodiment of the present invention.

FIG. 3 is a flow chart illustrating the stationary noise pattern removal method according to another embodiment of the present invention. Referring to FIG. 3, stationary noise pattern removal method 50 operates in the same manner as method 20 in acquiring a frame of pixel data (step 52) and calculating a predicted pixel value based on a neighborhood of pixels for each pixel (step 54). That is, one or more pixel value prediction algorithms are used to calculate the predicted pixel value based on the neighborhood of pixel values. Then, the predicted pixel value, $\psi(x,y)$, is subtracted from the measured pixel value $p(x,y)$, leaving as a residual $\delta(x,y)$ which is indicative of the predicted noise value for the pixel (step 56).

Having calculated the predicted pixel value and the predicted noise value for each pixel, method 50 proceeds to estimate the reliability or the confidence of the prediction calculated. At step 58, a confidence estimate, denoted $\gamma(x,y)$, is calculated for each predicted pixel value. In the present embodiment, the confidence estimate $\gamma(x,y)$ for each pixel is determined based on the nature of the neighborhood of pixels, that is, what the neighborhood of pixels really looks like. The contrast, the high frequency content, and the smoothness of the pixel area are used to derive a confidence estimate for the predicted pixel value. A weight factor α, proportional to the confidence estimate, is derived to blend the predicted noise value into the fixed noise pattern (FPN) estimate based on the level of confidence.

At step 60, the FPN estimate for each pixel is calculated using the predicted noise value and the confidence estimate. The FPN estimate is temporally filtered to remove random noise contributions from the sampling and quantization process and to create the FPN estimate denoted as $\chi(x,y)$ (step 62). In one embodiment, an IIR-Filter as a temporal filter is used to compute FPN estimate $\chi(x,y)$ as follows:

$$\chi_n(x,y)=\alpha*\gamma(x,y)*\delta_n(x,y)+((1-\alpha)*\gamma(x,y))*\chi_{n-1}(x,y). \quad [\text{Eq. 3}]$$

In equation 3 above, the weight factor α determines the time constant of the filter, assuming reliable predictions.

Finally, the FPN estimate $\chi(x,y)$ is used to remove the fixed pattern noise contribution from the captured image. Specifically, the FPN estimate $\chi(x,y)$ is subtracted from the captured pixel values to derive "clean" or noise-free pixel values for the captured frame of pixel data (step 64). Method 50 then returns to the start of the process where the next frame of pixel data is acquired. The stationary noise pattern removal method is an on-going operation where predictions for the pixel values are continually calculated and the estimates for the fixed pattern noise are continually updated, thereby forming a close loop algorithm. Depending on the confidence of the noise prediction, more or less amount of the predicted noise value is incorporated into the FPN estimate. Over time, the FPN estimate $\chi_n(x,y)$ will converge towards an almost constant value $\chi_\infty(x,y)$ if a large number of reliable predictions have been integrated. As a result, a fixed pattern noise estimate $\chi_\infty(x,y)$ for the digital imaging system that accurately represents the fixed pattern noise of the image sensor is attained.

As described above, the implementation of the stationary noise pattern removal method in FIGS. 1 and 3 requires additional memory storage, such as 6-8 bits, for each pixel. In some cases, the additional memory storage may not be available in a digital imaging system or it may not be feasible to incorporate additional memory into a digital imaging system. According to another aspect of the present invention, a stationary noise pattern removal method applies the noise prediction algorithm to a prediction area for calculating a set of scaling values which scaling values are used to calculate a noise estimate for the entire frame based on a stored reference noise image. When the noise prediction algorithm is applied only to a limited prediction area, only a small amount of additional memory is required and thus the stationary noise pattern removal method can be applied even when memory storage is constrained.

Figure 4:
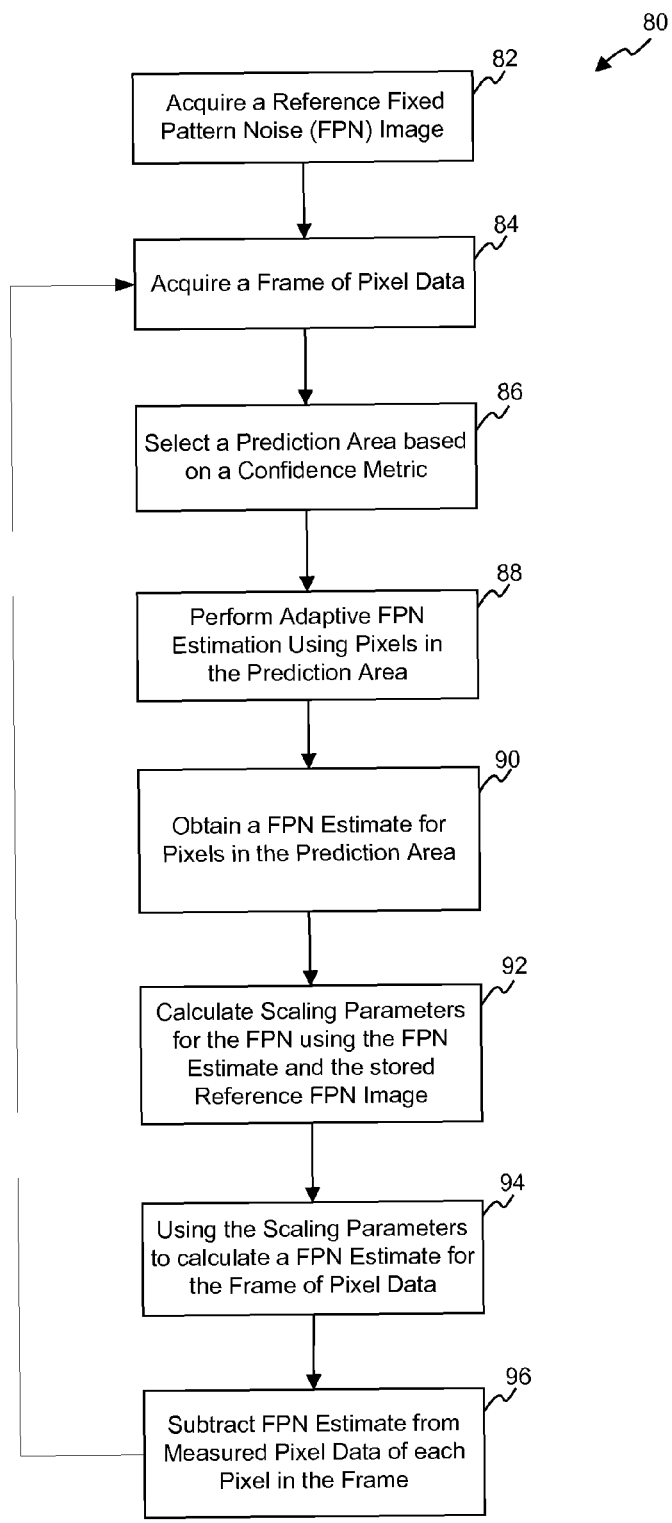
FIG. 4 is a flow chart of the stationary noise pattern removal method according to an alternate embodiment of the present invention.

FIG. 4 is a flow chart of the stationary noise pattern removal method according to an alternate embodiment of the present invention. Referring to FIG. 4, stationary noise pattern removal method 80 is similar to method 50 of FIG. 3 except that a one-time calibration step is performed and that the adaptive noise estimation algorithm is applied only to a limited prediction area.

Referring to FIG. 4, method 80 starts with a one-time calibration of the digital image sensor (step 82). The calibration step involves acquiring a reference noise image such as by taking an image of a homogeneous, smooth surface. Typically, the surface is a gray surface. The resulting reference noise image is a "bumpy" or "textured" surface because of the presence of a fixed noise pattern. In effect, the fixed pattern noise is an image superimposed on the image of the homogeneous, smooth surface. If the clean smooth surface is denoted as P(x,y) or P, the reference noise image can be denoted as $P_n(x,y)$ and can be expressed as follows:

$$P_n(x,y)=P(x,y)+F(x,y,P(x,y))=P+F(x,y,p) \quad [\text{Eq. 4}]$$

where F(x,y,p) denotes the fixed pattern noise superimposed over the reference image. The reference noise image is stored as a quantized reference map δ(x,y,p) and P.

Stationary noise pattern removal method 80 then proceeds to acquire a frame of pixel data (step 84). A prediction area, denoted Ω, is then selected based on a confidence metric (step 86). The size of the prediction area Ω can be limited to anywhere between 10×10 to 20×20 pixels to limit the amount of additional memory required to implement method 80. In one embodiment, the prediction area is selected by searching within the frame of pixel data using a random walk algorithm. The prediction area is preferably an area of smooth texture and of low contrast.

In the present embodiment, method 80 calculates a "confidence metric" for the prediction area based on one of the above-described algorithms (contrast, spatial frequency content within the prediction area). If the confidence value for the prediction area is too low, for example below a preset threshold, method 80 will terminate the processing for the current frame and retry again when a new frame has been captured. That is, method 80 will skip the remaining steps and return to step 84 to wait for the acquisition of the next frame of pixel data. In this manner, when the image content in the prediction area is of a nature that renders the estimation of FPN inaccurate, the FPN estimation process is skipped to save processing cycles. The use of the confidence metric to determine whether to continue method 80 is optional. When processing cycle saving is not critical, method 80 can operate by selecting a prediction area and performing the following steps for FPN estimation regardless of the nature of the image content of the prediction area.

Then, the adaptive noise estimation algorithm described with reference to FIG. 1 or FIG. 3 is performed for the pixels in the prediction area (step 88). That is, for each pixel in the prediction area Ω, a predicted pixel value is calculated based on the neighborhood of pixels. Then, a predicted noise value is calculated for the pixel based on the predicted pixel value and the measured pixel value. A confidence indicator or confidence estimate is computed. Depending on the confidence level of the predicted pixel value, more or less or none of the predicted noise value is blended into the fixed pattern noise (FPN) estimate.

As a result of performing the adaptive noise estimation algorithm on the pixels in the prediction area, a FPN estimate for the pixels in the prediction area is obtained (step 90). Over time when a large number of reliable predictions have been integrated, a fixed pattern noise estimate $\chi_\infty(x,y,p_\infty)$, where $p_\infty=\text{mean}(\Omega)$, is derived for all pixels in the prediction area. The FPN estimate $\chi_\infty$ is a function of the local noise in the limited prediction area.

Using the assumption that the real fixed pattern noise, represented by the FPN estimate $\chi_\infty(x,y,p_\infty)$, is a scaled function of the stored reference noise image, scaling parameters for the fixed pattern noise can be calculated using the reference noise image (step 92). Specifically, a scaling model for the FPN estimate $\chi_\infty(x,y,p_\infty)$ is given as:

$$\chi_\infty(x,y,p_\infty) \cong m(p_\infty)*\delta_\Omega(x,y,p)+\epsilon \quad [\text{Eq. 5}]$$

where $\delta_\Omega(x,y,p)$ represents the reference noise image in the prediction area Ω. The scaling parameters $m(p_\infty)$ and $\epsilon$ can be determined by creating a least square error fit of the reference noise image $\delta_\Omega(x,y,p)$ to the FPN estimate $\chi_\infty(x,y,p_\infty)$ for all the pixels in the prediction area.

Using the scaling parameters $m(p_\infty)$ and $\epsilon$ and the reference noise image $\delta(x,y,p)$, a FPN estimate $\chi(x,y)$ for all the pixels in the image area can be computed (step 94). Specifically, the FPN estimate $\chi(x,y)$ is given as:

$$\chi(x,y)=m(p_\infty)*\delta(x,y,p)+\epsilon \quad [\text{Eq. 6}]$$

where the scaling parameters $m(p_\infty)$ and $\epsilon$ are computed in the previous steps. The resulted FPN estimate $\chi(x,y)$ can be subtracted from the measured pixel data to derive the clean pixel data (step 96) performed once and does not need to be repeated once a reference noise image is acquired and stored.

By selecting only a limited prediction area for performing the adaptive noise estimation algorithm, the additional memory required to implement method 80 is minimized. In one embodiment, memory locations allocated for the on-screen display can be used to store the data for the prediction area.

In FIG. 4, the adaptive noise prediction algorithm is shown as being applied at the capture of every frame of pixel data. In other embodiments, the noise prediction algorithm can be applied at regular intervals, such as every 10 frames captured, to update the fixed pattern noise estimate. It is not important that the fixed pattern noise estimate be updated at every capture as over time, the fixed pattern noise estimate will converge to a constant value when sufficient reliable predictions have been integrated.

The stationary noise pattern removal method of the present invention can be applied to a variety of digital imaging systems incorporating digital image sensors. In one embodiment, the fixed pattern noise subtraction method of the present invention is applied in a video imaging system including a digital image sensor component and a digital image processor component. Such a video imaging system is described in copending and commonly assigned U.S. patent application Ser. No. 10/634,302, entitled "A Video Imaging System Including A Digital Image Sensor And A Digital Signal Processor," filed Aug. 4, 2003, of Michael Frank et al., which patent application is incorporated herein by reference in its entirety.

Figure 5:
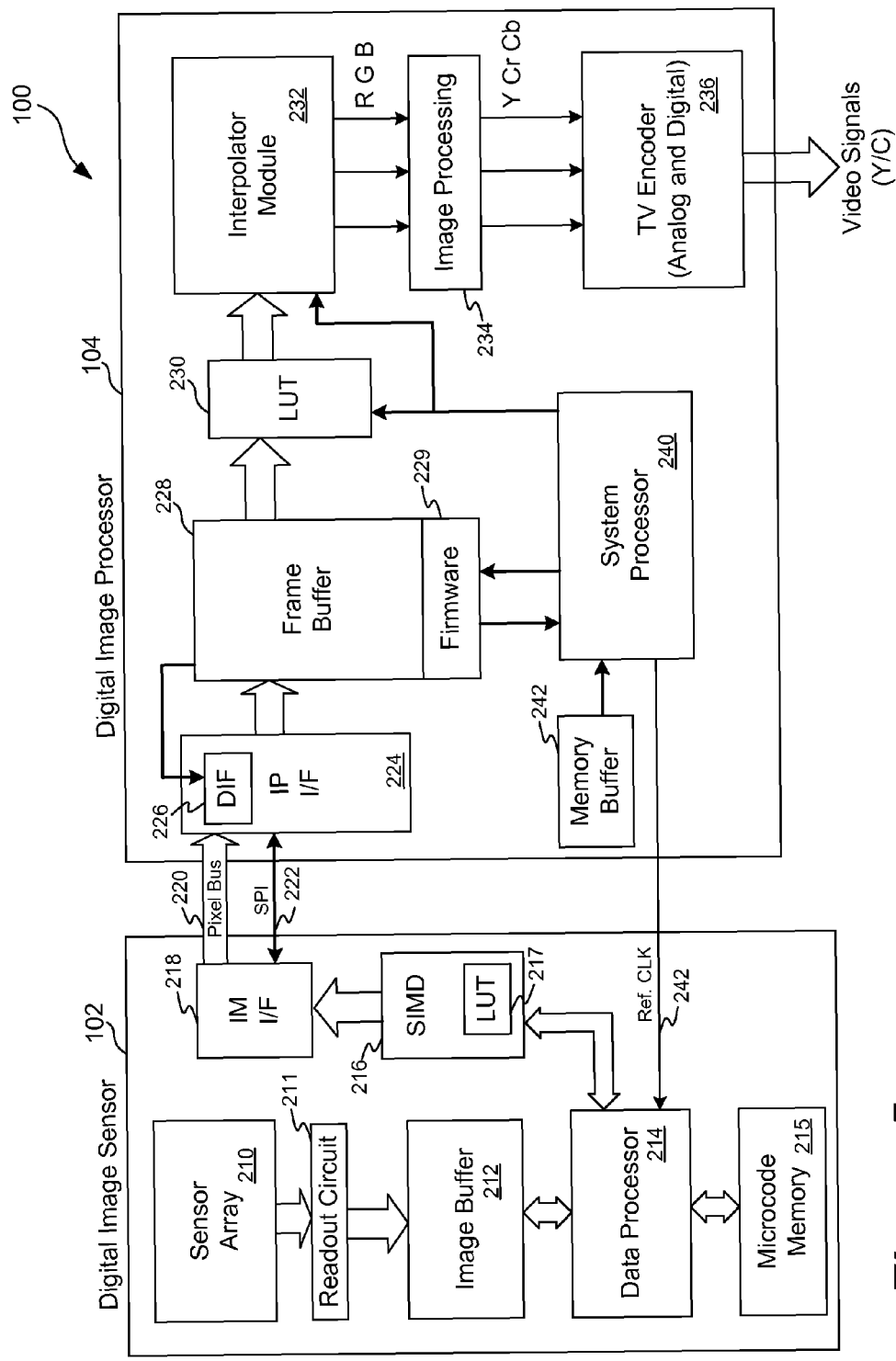
FIG. 5 is a block diagram of a video imaging system based on FIG. 1 of U.S. patent application Ser. No. 10/634,302 and modified to implement the fixed pattern noise subtraction method according to one embodiment of the present invention.

FIG. 5 is a block diagram of a video imaging system based on FIG. 1 of the aforementioned '302 patent application and modified to implement the fixed pattern noise subtraction method according to one embodiment of the present invention. In brief, digital image sensor 102 of video imaging system 100 is an operationally "stand-alone" imaging system operative to capture image data and provide entire frame of image data to digital image processor 104 for processing. Digital image processor 104 includes a frame buffer for storing the image data transferred from digital image sensor 102 and processing the image data based on instructions from system processor 240.

Figure 6:
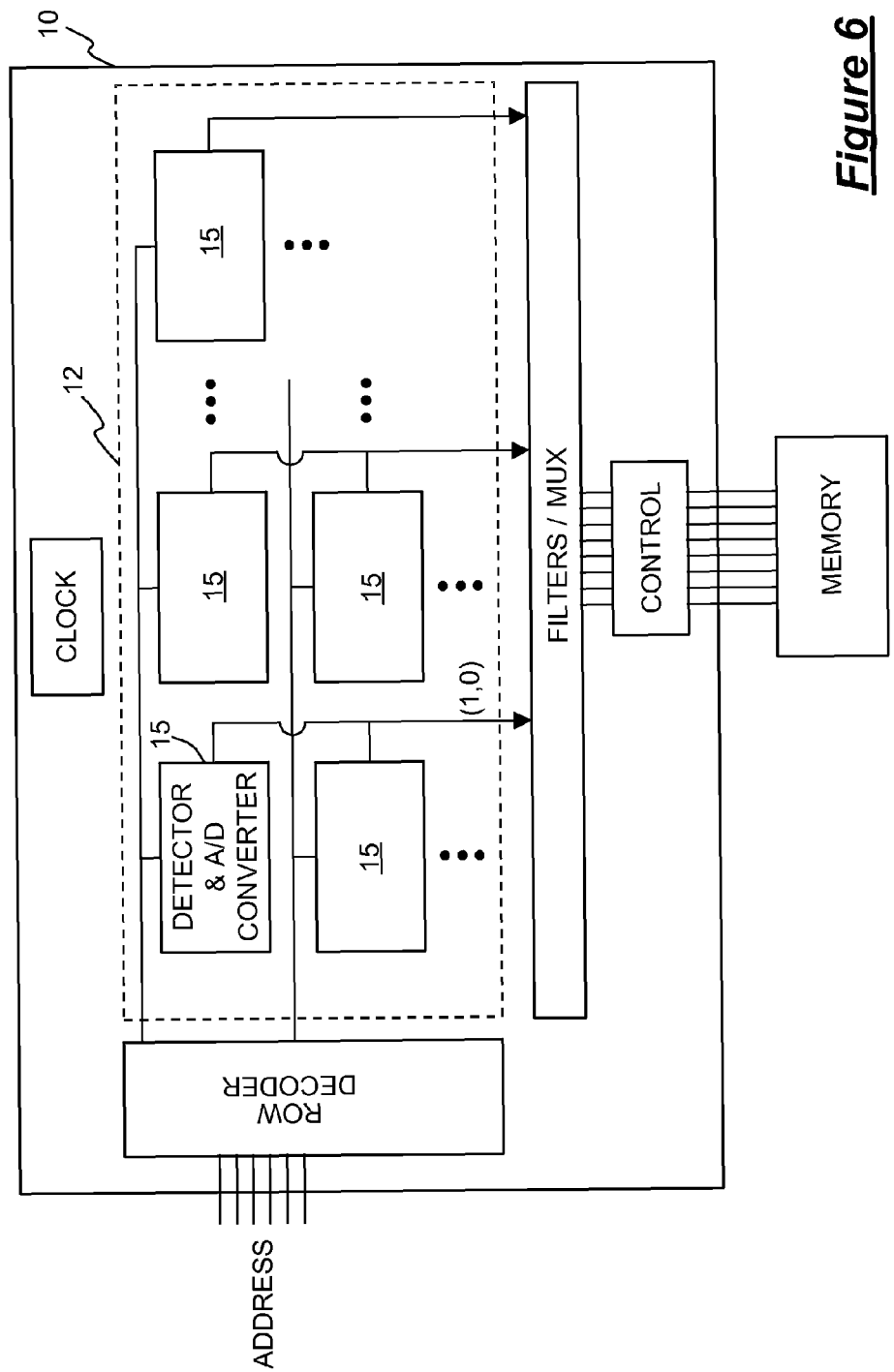
FIG. 6 is a block diagram of a digital image sensor as described in U.S. Pat. No. 5,461,425 of Fowler et al.

In one embodiment, image sensor 102 is a digital image sensor implemented as a digital pixel sensor (DPS), that is a CMOS image sensor with pixel level analog-to-digital conversion capabilities, as described in the aforementioned '425 patent. In the present description, a digital pixel sensor (DPS) array or a sensor array refers to a digital image sensor having an array of photodetectors where each photodetector produces a digital output signal. In one embodiment of the present invention, the DPS array implements the digital pixel sensor architecture illustrated in FIG. 6 and described in the aforementioned '425 patent. The DPS array of the '425 patent utilizes pixel level analog-to-digital conversion to provide a digital output signal at each pixel. The pixels of a DPS array are sometimes referred to as a "sensor pixel" or a "sensor element" or a "digital pixel," which terms are used to indicate that each of the photodetectors of a DPS array includes an analog-to-digital conversion (ADC) circuit, and is distinguishable from a conventional photodetector which includes a photodetector and produces an analog signal. The digital output signals of a DPS array have advantages over the conventional analog signals in that the digital signals can be read out at a much higher speed. Of course, other schemes for implementing a pixel level A/D conversion in an area image sensor may also be used in the image sensor of the present invention.

Copending and commonly assigned U.S. patent application Ser. No. 09/567,638, entitled "Integrated Digital Pixel Sensor Having a Sensing Area and a Digital Memory Area" of David Yang et al., describes an integrated DPS sensor with an on-chip memory for storing at least one frame of pixel data. The incorporation of an on-chip memory in a DPS sensor alleviates the data transmission bottleneck problem associated with the use of an off-chip memory for storage of the pixel data. In particular, the integration of a memory with a DPS sensor makes feasible the use of multiple sampling for improving the quality of the captured images. Multiple sampling is a technique capable of achieving a wide dynamic range in an image sensor without many of the disadvantages associated with other dynamic range enhancement techniques, such as degradation in signal-to-noise ratio and increased implementation complexity. Copending and commonly assigned U.S. patent application Ser. No. 09/567,786, entitled "Multiple Sampling via a Time-indexed Method to Achieve Wide Dynamic Ranges" of David Yang et al., describes a method for facilitating image multiple sampling using a time-indexed approach. The aforementioned patent applications are incorporated herein by reference in their entireties.

Figure 7:
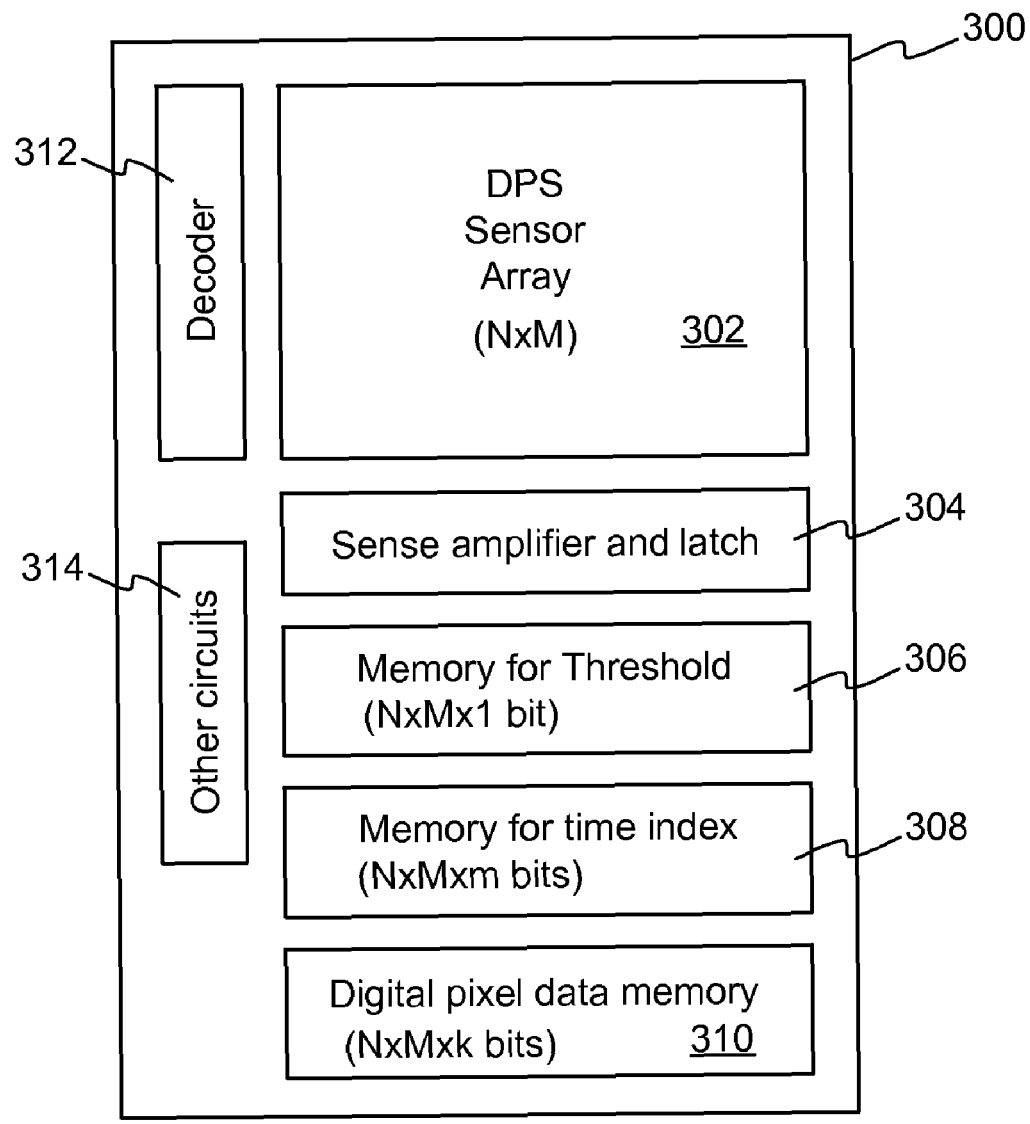
FIG. 7 is a functional block diagram of an image sensor as described in U.S. patent application Ser. No. 09/567,786.

FIG. 7 duplicates FIG. 3 of the '786 patent application and shows a functional block diagram of an image sensor 300 which may be used to practice the method of the present invention. The operation of image sensor 300 using multiple sampling is described in detail in the '786 patent application. Image sensor 300 includes a DPS sensor array 302 which has an N by M array of pixel elements. Sensor array 302 employs either the dedicated ADC scheme or the shared ADC scheme and incorporates pixel level analog-to-digital conversion. A sense amplifier and latch circuit 304 is coupled to sensor array 302 to facilitate the readout of digital signals from sensor array 302. The digital signals (also referred to as digital pixel data) are stored in digital pixel data memory 310. To support multiple sampling, image sensor 300 also includes a threshold memory 306 and a time index memory 308 coupled to sensor array 302. Threshold memory 306 stores information of each pixel indicating whether the light intensity value measured by each pixel in sensor array 302 has passed a predetermined threshold level. The exposure time indicating when the light intensity measured by each pixel has passed the threshold level is stored in time index memory 308. As a result of this memory configuration, each pixel element in sensor array 302 can be individually time-stamped by threshold memory 306 and time index memory 308 and stored in digital pixel data memory 310. A DPS image sensor employing multiple sampling and MCBS analog-to-digital conversion described above is capable of recording 14 to 16 or more bits of dynamic range in the captured image, in contrast with the 10 bits of dynamic range attainable by conventional image sensors. In the present embodiment, digital image sensor 102 in FIG. 5 is a DPS image sensor and is implemented in the same manner as image sensor 300 of FIG. 7 to support multiple sampling for attaining a high dynamic range in image capture.

When the stationary noise pattern removal method the present invention is incorporated in video imaging system 100 of FIG. 5, the predicted pixel values, predicted noise values, the FPN estimate and/or the reference noise image, collectively referred to as the noise prediction data, can be stored in a memory buffer 242 accessible by system processor 240 for generating the noise prediction for each pixel value. In one embodiment, the noise prediction data is stored in a memory buffer separate from frame buffer 228 of digital image processor 104. For example, the noise prediction data can be stored in memory buffer 242 as well. However, in an alternate embodiment of the present invention, a unified memory, such as the frame buffer, is used to store the noise prediction data as well as the pixel values of the captured image. Using a unified memory to store the noise prediction data as well as the captured image has the advantage of efficient memory usage by allowing the reuse of memory locations in the frame buffer not used by the captured image to store the reference image. For instance, when digital image processor 104 stores pixel data m bits, a captured image taken at low light conditions can be expressed in less than m bits. Thus, when the captured image and the noise prediction data are stored in the same memory, such as frame buffer 228, memory locations not used to store the captured image can be used to store the noise prediction data. Also, as described above, when method 80 is employed, only limited memory space is needed to store the noise prediction data and the memory allocated for the on-screen display can be used to store the noise prediction values for the prediction area.

In digital image processor 104, the subtraction of the noise component from the image component can be carried out using an arithmetic unit. Alternately, a lookup table can be used to perform the subtraction. In one embodiment, lookup table 230 is used to perform the subtraction of the FPN estimate from the measured pixel values. Specifically, lookup table 230 subtracts n bits of noise estimate from 12-n bits of image data to generate the final pixel values and converts the final pixel values into binary 14 bit pixel values. The advantage of using a lookup table to perform the subtraction is that other complex operation can be performed at the same time as the subtraction.

When the stationary noise pattern removal method of the present invention is implemented in video imaging system 100, effective and accurate fixed pattern noise removal can be realized. The sensitivity of video imaging system 100 can be greatly improved, particularly for low illumination images.

The above detailed descriptions are provided to illustrate specific embodiments of the present invention and are not intended to be limiting. Numerous modifications and variations within the scope of the present invention are possible. The present invention is defined by the appended claims.

I claim:

1. A method for subtracting fixed pattern noise in a digital imaging system incorporating a digital image sensor, comprising:

acquiring a reference noise image of a homogeneous, smooth surface;

acquiring a frame of pixel data;

selecting a prediction area within the frame of pixel data;

for each pixel in the prediction area, calculating a predicted pixel value based on the pixel data of a neighborhood of pixels surrounding the pixel and using one or more pixel value prediction algorithms;

for each pixel in the prediction area, calculating a predicted noise value using the predicted pixel value and the pixel data for the pixel;

for each pixel in the prediction area, determining the nature of the image at the neighborhood of pixels used to calculate the predicted pixel value;

calculating a confidence estimate for each predicted pixel value based on the nature of the image at the neighborhood of pixels surrounding the pixel;

calculating a prediction area noise estimate for each pixel in the prediction area using the predicted noise value and the confidence estimate, wherein the confidence estimate determines the amount of predicted noise value to be incorporated into the prediction area noise estimate for the pixel;

temporally filtering the prediction area noise estimate for each pixel in the prediction area;

calculating scaling parameters for a fixed pattern noise estimate of the frame of pixel data using the temporally filtered prediction area noise estimate and the reference noise image;

calculating the fixed pattern noise estimate for the frame of pixel data using the scaling parameters and the reference noise image; and subtracting the fixed pattern noise estimate for each pixel from the frame of pixel data to generate a final image.

2. The method of claim 1, wherein calculating scaling parameters for a fixed pattern noise estimate of the frame of pixel data using the temporally filtered prediction area noise estimate and the reference noise image comprises:

modeling the temporally filtered prediction area noise estimate as $\chi \equiv m^*\delta_\Omega + \epsilon$, where m and $\epsilon$ are the scaling parameters, and $\delta_\Omega$ represents the pixel data for the reference noise image in the prediction area; and determining values of the scaling parameters m and $\epsilon$ using a least square error fit of the reference noise image $\delta_\Omega$ to the temporally filtered prediction area noise estimate $\chi$ for all the pixels in the prediction area.

3. The method of claim 1, wherein calculating the fixed pattern noise estimate for the frame of pixel data using the scaling parameters and the reference noise image comprises:

calculating the fixed pattern noise estimate $\chi'$ using the equation $\chi' = m^*\delta + \epsilon$, where $\delta$ represents the pixel data of the reference noise image of the frame of pixel data.

4. The method of claim 1, wherein calculating a prediction area noise estimate for each pixel in the prediction area using the predicted noise value and the confidence estimate comprises:

comparing the confidence estimate for the pixel to a predetermined threshold;

if the confidence estimate for the pixel is less than the predetermined threshold, calculating the prediction area noise estimate without incorporating the predicted noise value; and if the confidence estimate for the pixel is greater than the predetermined threshold, calculating the prediction area noise estimate by incorporating the predicted noise value.

5. The method of claim 1, wherein calculating a prediction area noise estimate for each pixel in the prediction area using the predicted noise value and the confidence estimate comprises:

calculating a weight factor proportional to the confidence estimate; and calculating the prediction area noise estimate by weighing the predicted noise value using the weight factor.

6. The method of claim 1, wherein calculating a predicted pixel value based on the pixel data of a neighborhood of pixels surrounding the pixel and using one or more pixel value prediction algorithms comprises using one or more pixel value prediction algorithms selected from the group of interpolation, medial filtering, interpolation using a weighted average, a contrast estimator, and a high frequency/texture detector based on a DCT/FFT (Discrete Cosine Transform/Fast Fourier Transform) algorithm.

7. The method of claim 1, wherein determining the nature of the image at the neighborhood of pixels comprises:

measuring the contrast of the image at the neighborhood of pixels, wherein when the contrast is high, the confidence estimate has a low value and when the contrast is low, the confidence estimate has a high value.

8. The method of claim 1, wherein determining the nature of the image at the neighborhood of pixels comprises:

measuring the high frequency content of the image at the neighborhood of pixels, wherein when the neighborhood of pixels includes high frequency content, the confidence estimate has a low value and when the neighborhood of pixels does not include high frequency content, the confidence estimate has a high value.

9. The method of claim 1, wherein determining the nature of the image at the neighborhood of pixels comprises:

measuring the smoothness of the image at the neighborhood of pixels, wherein when the smoothness is low, the confidence estimate has a low value and when the smoothness is high, the confidence estimate has a high value.

* * * * *